United States Patent [19]

Kuhn et al.

[11] 4,158,204

[45] Jun. 12, 1979

[54] TIME CORRECTION SYSTEM FOR MULTI-NOZZLE INK JET PRINTER

[75] Inventors: Lawrence Kuhn, Ossining; Robert A. Myers, New York; Roy L. Russo, Yorktown Heights, all of N.Y.

[73] Assignee: International Business Machines Corporation, Armonk, N.Y.

[21] Appl. No.: 899,136

[22] Filed: Apr. 24, 1978

Related U.S. Application Data

[63] Continuation of Ser. No. 756,044, Dec. 30, 1976, abandoned.

[51] Int. Cl.[2] .............................................. G01D 18/00
[52] U.S. Cl. ....................................................... 346/75
[58] Field of Search .......................................... 346/75

[56] References Cited

U.S. PATENT DOCUMENTS

| | | | |
|---|---|---|---|
| 3,739,393 | 6/1973 | Lyon | 346/75 X |
| 3,907,429 | 9/1975 | Kuhn | 346/75 X |
| 3,977,010 | 8/1976 | Erickson | 346/75 |
| 3,984,843 | 10/1976 | Kuhn | 346/75 |

OTHER PUBLICATIONS

Fisher et al.; Reducing Drop Misregistration...in a Linear Ink Jet Array; IBM Tech. Disc. Bulletin, vol. 17, No. 10, Marca 1975, pp. 3066-3067.
Lominac, H. R.; Ink Jet Velocity Error Compensation; IBM Tech. Disc. Bulletin, vol. 18, No. 6, Nov. 1975, p. 1983.
Lane et al.; Correction of Aerodynamic Drag in Ink Jet Streams, vol. 18, No. 10, Marca 1976, pp. 3474–3475.

*Primary Examiner*—Joseph W. Hartary
*Attorney, Agent, or Firm*—Graham S. Jones, II

[57] ABSTRACT

In an ink jet nozzle per spot printer, the transit time of each stream is measured on a periodic basis. In response to the measured transit times, the time at which information imparting signals are applied to the respective charge electrodes is controlled. The transit time is measured (counted) in units of a drop cycle. The slowest count is detected, and the difference is taken between the transit time of the slowest stream and all other streams. In the instance when there is a transit time difference of zero between the slowest stream and a given stream, the printing signal is provided to the charge electrode without delay. In the instances when a transit time difference is detected, an information imparting signal is applied to the charge electrode with a delay dependent upon the sensed transit time difference. A data register has information signals stored therein which are indicative of the data to be printed. Such data will be printed during an appropriate portion of a data cycle. The data cycle is broken down into several drop formation periods, any one of which can be used to provide a delayed information signal by means of a correction register. The correction register has data stored therein indicative of whether the information stored in the data register is to be applied to the respective charge electrodes during a specific drop formation period. An output register responds to inputs from the data register and correction register for passing the information imparting signals to the respective charge electrodes in the proper timing sequence.

11 Claims, 10 Drawing Figures

N = 8, M = 12

| JET | $C_{11}$ | $C_{10}$ | $C_9$ | $C_8$ | $C_7$ | $C_6$ | $C_5$ | $C_4$ | $C_3$ | $C_2$ | $C_1$ | $C_0$ |
|---|---|---|---|---|---|---|---|---|---|---|---|---|
| 1 | 0 | 0 | 0 | 0 | 0 | 0 | 0 | 0 | 1 | 1 | 1 | 1 |
| 2 | 0 | 0 | 0 | 1 | 1 | 1 | 1 | 0 | 0 | 0 | 0 | 0 |
| 3 | 0 | 0 | 1 | 1 | 1 | 1 | 0 | 0 | 0 | 0 | 0 | 0 |
| 4 | 0 | 0 | 0 | 0 | 1 | 1 | 1 | 1 | 0 | 0 | 0 | 0 |
| 5 | 0 | 0 | 0 | 0 | 0 | 0 | 0 | 1 | 1 | 1 | 1 | 0 |
| 6 | 0 | 0 | 0 | 0 | 0 | 0 | 1 | 1 | 1 | 1 | 0 | 0 |
| 7 | 0 | 0 | 0 | 0 | 0 | 1 | 1 | 1 | 1 | 0 | 0 | 0 |
| 8 | 0 | 0 | 0 | 0 | 0 | 1 | 1 | 1 | 1 | 0 | 0 | 0 |

TIME CORRECTION SYSTEM FOR MULTI-NOZZLE INK JET PRINTER

This is a continuation of application Ser. No. 756,044 filed Dec. 30, 1976 now abandoned.

BACKGROUND OF THE INVENTION (1) Field of the Invention

This invention relates to recorders and, more particularly, to ink jet recorders in which droplets of ink are projected through an orifice onto a receiving print medium.

(2) Description of the Prior Art

U.S. Pat. No. 3,886,564 to Naylor et al discloses an ink jet printing system in which the velocity of an ink jet stream is detected and which responds to the detected velocity. A velocity signal is derived which is then compared to a reference signal, with the resulting comparison being applied to a logic circuit which controls the application of an information signal to the charge electrode structure.

U.S. Pat. No. 3,907,429 to Kuhn et al discloses an ink jet printing system in which a direct velocity measurement of the droplets in an ink stream is achieved through utilizing a strobe light source and passing the stream of droplets between the strobe light source and a pair of apertures with light detecting means therebehind. Depending upon the distance between the apertures, various means are employed for determining the velocity of the droplets in accordance with the relation of the droplets to the apertures during the strobing of the light source.

U.S. Pat. No. 3,911,445 of Foster discloses an ink jet printing system in which the time a droplet arrives at a given position is sensed for providing a position signal which is compared with a reference signal indicative of when the given droplet is supposed to arrive at the given position. In response to a discrepancy between the position signal and the reference signal, an alarm indication is manifested, and a phase correction is made relative to drop excitation and drop charging.

The prior art discussed teaches use of sensed variations in velocity of an ink jet stream to determine the time when an information signal is to be applied to a charge electrode to effect printing. However, the above prior art does not teach the measurement of variations in velocity from stream-to-stream in a multi-jet printer, nor does it teach use of such data to determine the difference between the slowest stream velocity and the velocity of each of the other streams to effect the delayed application of an information imparting signal to the corresponding charge electrode. In addition, the prior art does not teach provision of data and correction registers to control an information imparting output register.

SUMMARY OF THE INVENTION

In accordance with this invention, a system is provided for printing by means of a plurality of liquid streams, each of which is selectively applied to mark a recording medium by energization of a control member. A means for measuring and determining the relative transit times of said streams is included. The relative transit times of the streams are used to provide a set of time-dependent correction factors for each stream which are used to time the selective use of information imparting data for each stream to provide output signals for imparting the information to the corresponding control member.

Nozzle imperfections, clearances, accumulations and deposits of ink, and the like tend to cause velocity variations which give rise to transit time variations. Furthermore, even if the velocities are identical it is possible to have transit time variations caused by nonuniform drop formation.

Accordingly, an object of this invention is to provide a system for neutralizing the errors in print registration attributable to time-dependent-and-independent variations in transit time from nozzle to nozzle in an array. The important transit time is time of flight from drop charging to impact on the paper.

In accordance with this invention a system is provided employing a plurality of movable elements, including means for measuring at selected times the transit times of each of the elements on an intermittent basis, and providing measured transit time values therefor, ordering means responsive to the measured transit time values for determining the relative order of the transit times of the elements and supplying a set of order signals representing that order, and means for energizing the elements at times varying from element-to-element in an order selected under control of the order signals.

In another system in accordance with this invention, means is provided for printing by means of a plurality of liquid streams each one of which is selectively applied to mark a recording medium. The improvement comprises means responsive to the measured transit time values for determining the relative order of the transit times of the streams and supplying a set of order signals representing the order, and means for energizing marking by the streams at times varying from stream-to-stream in an order selected under control of the order signals, whereby the effective transit times of the streams are compensated for during operation of the system for printing.

Further, in accordance with this invention, a multi-jet stream ink jet printer system includes drop timing error correction. The system comprises nozzle means for forming and propelling a plurality of streams of ink jet drops, controlling means for controlling drops from each of the nozzle means, and sensor means positioned downstream from the nozzle means in the path of travel of the ink drops. Means are provided for measuring the transit time $T_n$ for a drop from each of the nozzles to the sensor means, as well as means for determining the longest transit time $T_{max}$ for all of said nozzles, means for calculating the difference $D_n$ in delay from the maximum delay for each of the nozzles $D_n = T_{max} - T_n$, means for calculating, based on differences $D_n$, a correction matrix for M drop periods per data period and N ink jet streams, and means for storing the correction matrix. A data register, a correction register, and output register, are provided. In addition, means for reading, reads the correction matrix out of the means for storing, one word at a time, until M words are read into the correction register. Means for enabling, enables the correction register to control the gating of data bits into the output register from the data register in order to delay each stream by a prescribed number of units of time from the beginning of a data period during which a given data bit must be printed.

Preferably, the controlling means comprises a plurality of deflecting means, or a plurality of charging means with one for each nozzle and deflection means. Preferably the registers are located on at least one integrated circuit chip bonded to a support with the support being integral with the charging means.

In a preferred form of the embodiment, the above sensor means is electrical. Still further, the sensor means is located adjacent to the edge of the location in the printer for a document to be printed, and preferably the sensor means is employed intermittently to measure such transit times.

Furthermore, it is preferred that the correction register is supplied a new correction word from the correction matrix for each drop formation period under control of the drop formation clock, and the data register is supplied a new data word for each data word period T.

A picture element is preferably comprised of a series of drops K successive drops long where $K>1$.

DESCRIPTION OF THE PREFERRED EMBODIMENT

Figure 1A:
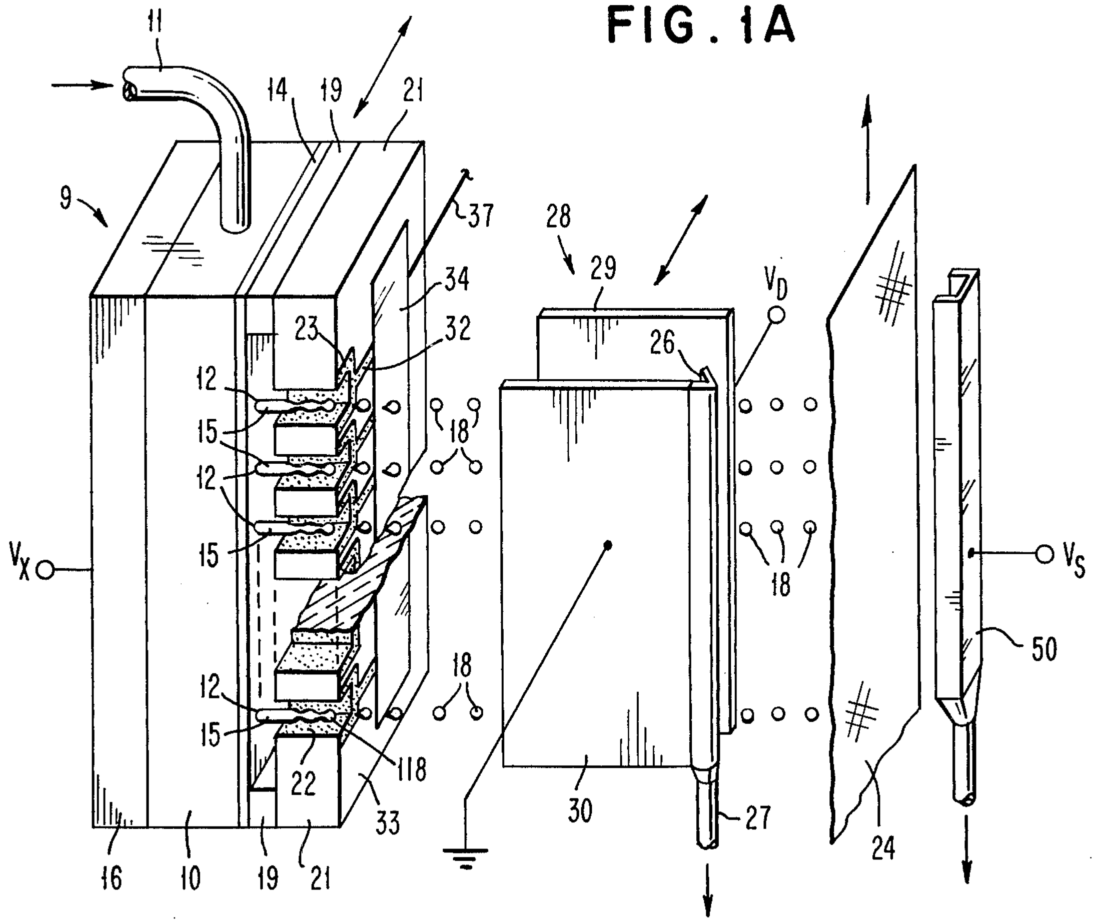
FIG. 1A shows a perspective of a multi-jet ink jet printing system in accordance with this invention.

FIG. 1A shows an ink jet printing system in which a head 9 with a vertical array of nozzles 12 sweeps back and forth across a page 24 of paper imprinting data thereon selectively. Depending upon requirements, the nozzle array can include from 2 to 5000 nozzles, printing may lines or a page at a time, in the extreme.

An ink manifold 10 is provided to which ink from a reservoir (not shown) is supplied through a supply tube 11. The ink is an electrically conductive liquid. The manifold 10 has the ink supplied under pressure so that the ink flows from nozzles 12 in a nozzle plate 14 as a plurality of liquid streams 15.

The manifold 10 is subjected to vibrations from suitable vibrating means 16 such as a piezoelectric transducer, for example. The vibrations created by the vibrating means 16 cause each of the streams 15 to be broken up into a plurality of substantially uniformly spaced droplets 18.

Figure 1B:
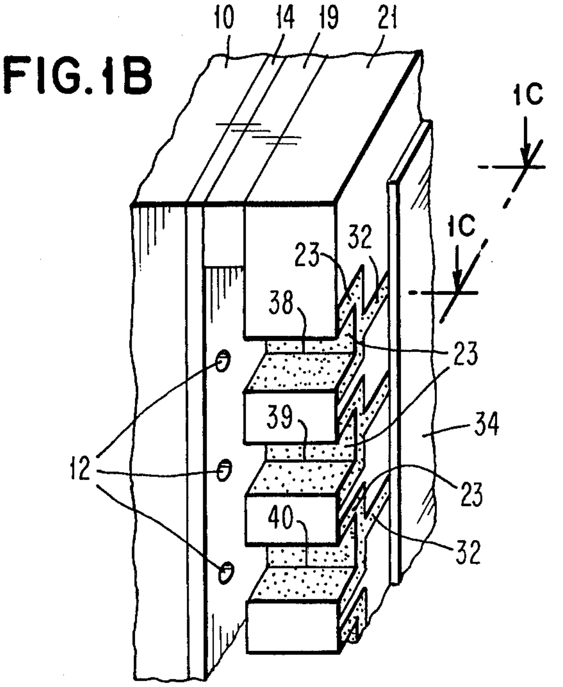
FIG. 1B shows a fragmentary perspective view of a nozzle, charging tunnel electrode structure and control circuit chip in accordance with FIG. 1A.

A spacer 19 disposes a charging head 20, which includes a substrate 21 formed of a suitable insulating material in spaced relation to the nozzle plate 14 so that each of a plurality of passageways 22 formed therein has the droplets 18 from the stream 15 break up within the passageway 22. The substrate 21 has a plated material 23 shown in FIG. 1B formed in a selected portion therein in surrounding relation to each of the passageways.

Therefore, when a voltage is supplied to the plated material 23, which functions as a charging electrode, the droplet 118, which is breaking off from the stream 15 but still connected thereto and disposed within the passageway 22, is charged. Charging of the droplet 118 by electrode 23 being activated results in droplet 118 not being utilized to print on a recording medium such as a paper 24, which is moving in the vertical direction indicated by arrow 25.

If the droplet 118 is charged by electrode 23, droplet 118 will deflect into gutter 26, which has a tube 27 returning the ink droplets 118 from gutter 26 to the reservoir to which the manifold 10 is connected through the supply tube 11. The charged droplet 118 is deflected into gutter 26 by a deflector 28.

The deflector 28 includes a pair of parallel electrodes 29 and 30 with a deflection voltage $V_o$ supplied to the electrode 29 and the electrode 30 being grounded and having the gutter 26 connected thereto. Accordingly, all of the charged droplets 18 are deflected by deflector 28 towards gutter 26. Thus, the print pattern on the paper 24 is determined by the droplets 18, which have not been charged within the passageways 22.

Each of the electrodes 23 is connected to a plated lead 32 on front surface 33 of the substrate 21. Each of the leads 32 is connected to chip 34 carrying a plurality of circuits which also are formed in the front surface 33 of the substrate 21. Each of the circuits preferably is formed by a plurality of FETs. Data, timing, and correction information is supplied to chip 34 on cable 37. Such an arrangement is illustrated in detail in FIG. 1B where head 9 includes nozzle plate 14 spaced from an insulating charge tunnel substrate 21 by spacers 19. Chip 34 is bonded to the charge tunnel substrate 21 with the active side of the chip 34 facing the charge tunnel substrate.

A plurality of holes or slots 38, 39 and 40 are formed in substrate 21. These slots are plated on the interiors and exteriors thereof with a conductive plating, with conductive strips 32 being plated in a like manner for forming charge electrode conductors, which are in contact with signal lines from chip 34.

Figure 1C:
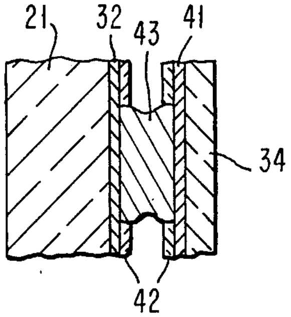
FIG. 1C shows the manner in which the control circuit chip of FIG. 1C is bonded to the charging tunnel electrode substrate.

FIG. 1C illustrates in more detail how the chip 34 is bonded to the charge tunnel substrate 21. A charge electrode conductor 32 is bonded to a signal line 41 by a solder connection 43. The solder 43 is reflowed at each position where it is desired to connect a signal line from the drive chip 34 to a charge electrode conductor on the insulating charge tunnel substrate 21. Layers 42 are composed of glass. The conductors and solder reflow joints may be passivated.

Electronic Compensation

The key to implementing an electronic scheme for correcting transit time errors lies in the obvious fact that the faster drops get to the paper sooner. Hence, if the information signal that permits a drop to print (recall the system prints with uncharged drops) is delayed a proper amount for the fast streams, then all drops which are supposed to strike the paper together can be made to do so (subject to a minimum error corresponding to the distance the paper moves during a single drop cycle, i.e., the time between successive drops).

This system measures the transit time of each stream on a periodic basis, processes the data so that the delay required for each charge electrode is available, and then uses the delay information to control the time at which the information signal is applied to each charge electrode.

Figures 2A, 2B:
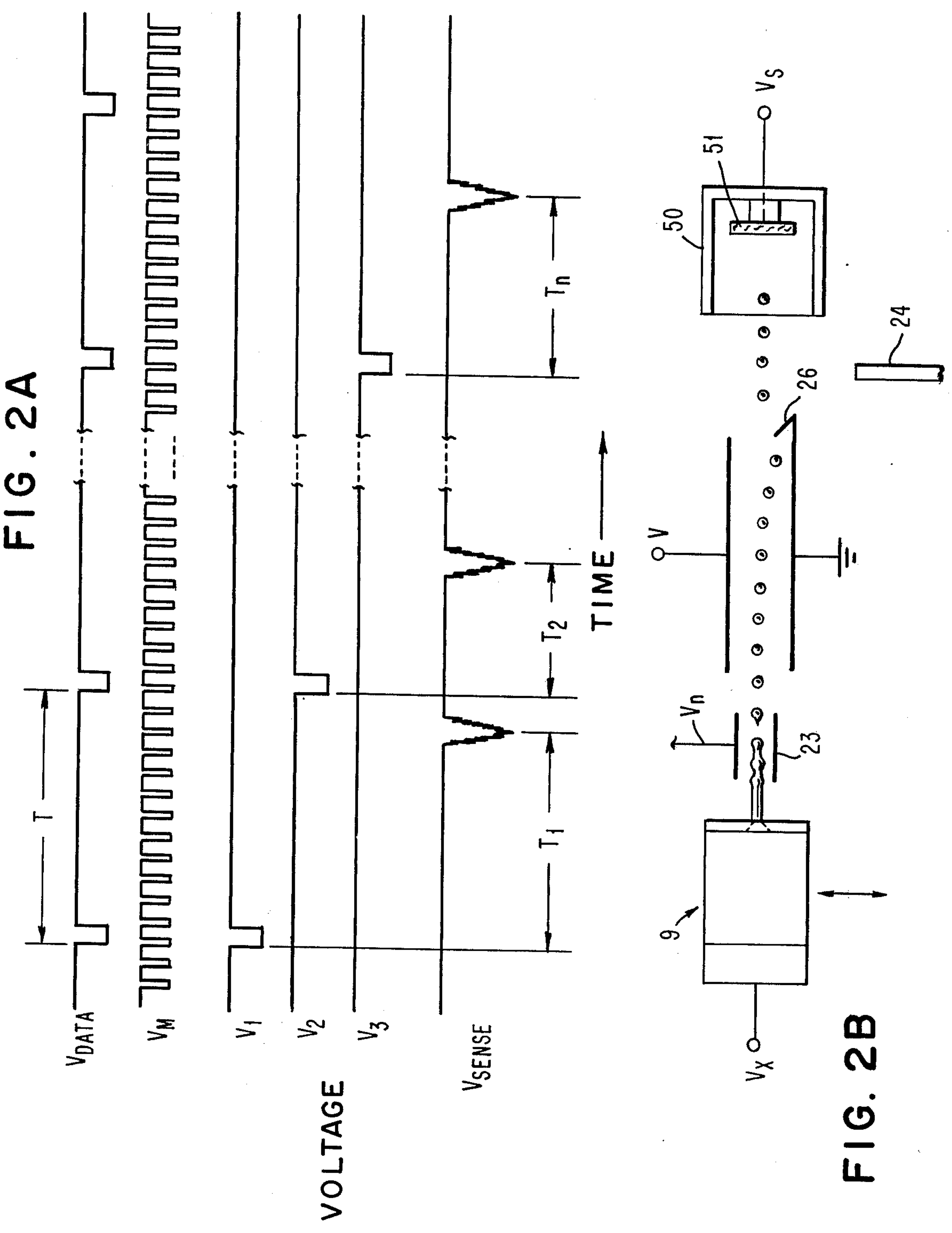
FIG. 2A shows the timing diagram for voltages associated with the system of FIG. 1A.
FIG. 2B is a schematic diagram of a portion of the mechanism of FIG. 1A for measuring the relative transit times of the various jets.

FIG. 2A shows a data signal which is generated by a data clock once at the beginning of every data period, which lasts M units of time, and, in FIG. 2A, M=12 as shown by the $V_M$ voltage which has a period equal in time to the period between generation of drops in FIG. 2B. When it is desired to calibrate the head 9, it is driven all the way to the left as shown in plan view in FIG. 2B and aimed at electrode 51 in target 50. The deflection field set up by voltage V is turned off. Sample drops from each of the jets are charged one at a time by application of voltage $V_n$ ($V_1$, $V_2$, $V_3$, . . . , $V_N$) as they pass by corresponding charging electrodes 23. The transit times $T_n$ shown in FIG. 2A are determined by counting the number of $V_M$ pulses that occur between application of the charging voltage $V_n$ and detection of the next $V_{sense}$ pulse by the sensor 50. Other means of measuring transit time are well known to those skilled in the art. The accuracy required is to time the flight to the nearest drop formation period.

The maximum correction that can be achieved in this embodiment is for a transit time error equal to the number of drop formation periods, M, during one data period minus the number of print drops for each picture element which is denoted by the letter K. Furthermore, the velocity increments will be of the order of the ratio of the wavelength to the flying distance, which is of the order of 1%. Of course, the process is repeated for each stream 12 in turn, and the transit time information is stored. Assuming a transit time can be measured in 1 millisecond, the most time that would be required (e.g., for a 1000 nozzle array) would be about 1 second. The frequency with which this measurement will be made will be a function of the design of the machine.

Processing

Figures 3, 4:
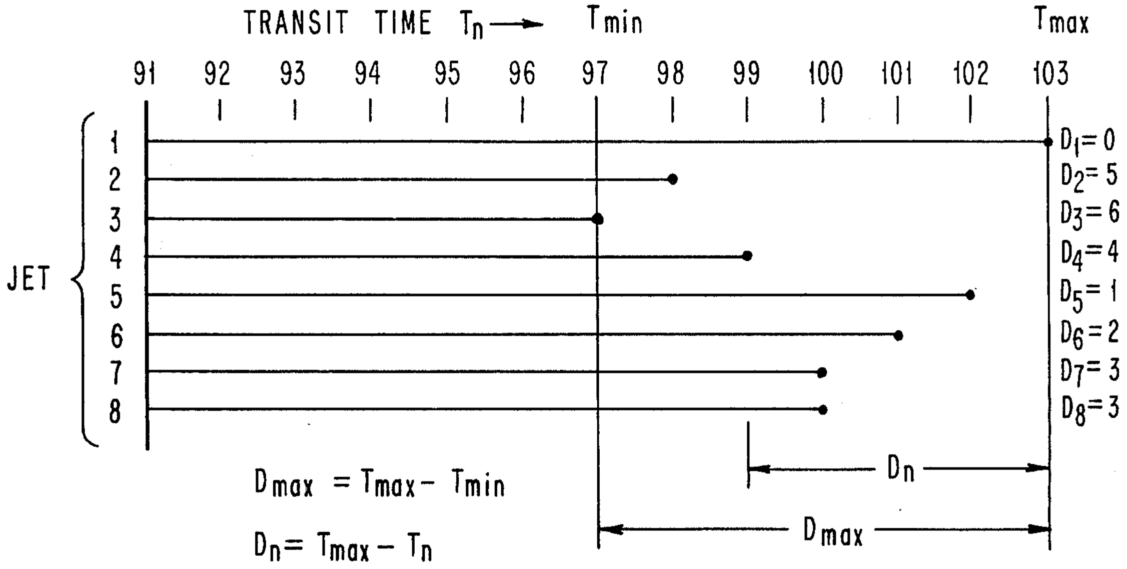
FIG. 3 shows an example of the transit times of ink drops for various jets having various delays $D_n$.
FIG. 4 shows a matrix of correction data for twelve correction times $C_m$ during a data cycle versus the eight different ink jets of FIG. 3.

In order to provide correction of errors caused by velocity, the correction information is placed into a special format in FIG. 4. First, assume that the transit time is measured in units of the drop cycle (of the order of 10 microseconds). The longest time count Tmax is detected for the slowest stream, and the difference Tmax$-T_n$ is taken between the transit time of the slowest stream and each other stream (assuming, for definiteness, 3-bit accuracy). Then, for all streams for which this transit time difference is 0, 0, 0, the printing signals are placed on the charge electrodes without delay. All those streams which differ by one unit require a delay of one drop cycle so that the information bit is applied to a drop which breaks off one cycle later.

The data is ordered as follows. Let N be the number of nozzles. Let M be the number of drop cycles for which it is intended to correct the transit time (e.g., eight or sixteen drop cycles; three or four bits, in other words). Place in memory, or other suitable storage, M words, each word being N bits, numbered 1, 2, . . . N. For each nozzle $n_0$ requiring zero delay, place a "1" in bit $n_0$ of the words 1, 2, . . . , K. For each nozzle $n_1$ requiring a delay of one drop cycle, place a "1" in bit $n_1$ of words 2, 3, . . . , 1+K. In general, for each nozzle $n_i$ requiring a delay of i drop cycles, place a "1" in bit $n_i$ of words i+1, . . . , i+K. After all N nozzles have been treated, place a "0" in all bit locations where a "1" has not been placed. Thus, an M×N bit correction matrix is formed carrying all the required delay information.

Referring to FIG. 3, an example of transit times $T_n$ for an eight-jet head is shown with a Tmax (maximum transit time) of 103 drop cycles for jet 1 and a Tmin (minumum transit time) of 97 drop cycles for jet 3. The difference between Tmax and Tmin is Dmax (maximum difference in transit times). Hence, Dmax=103−97=6 drop cycles. The difference between Tmax and any given transit time $T_n$ for jet n=0, 1, 2 . . . 8 is Dn (difference in transit time from Tmax for nozzle n), $D_n$=Tmax$-T_n$.

Figure 5:
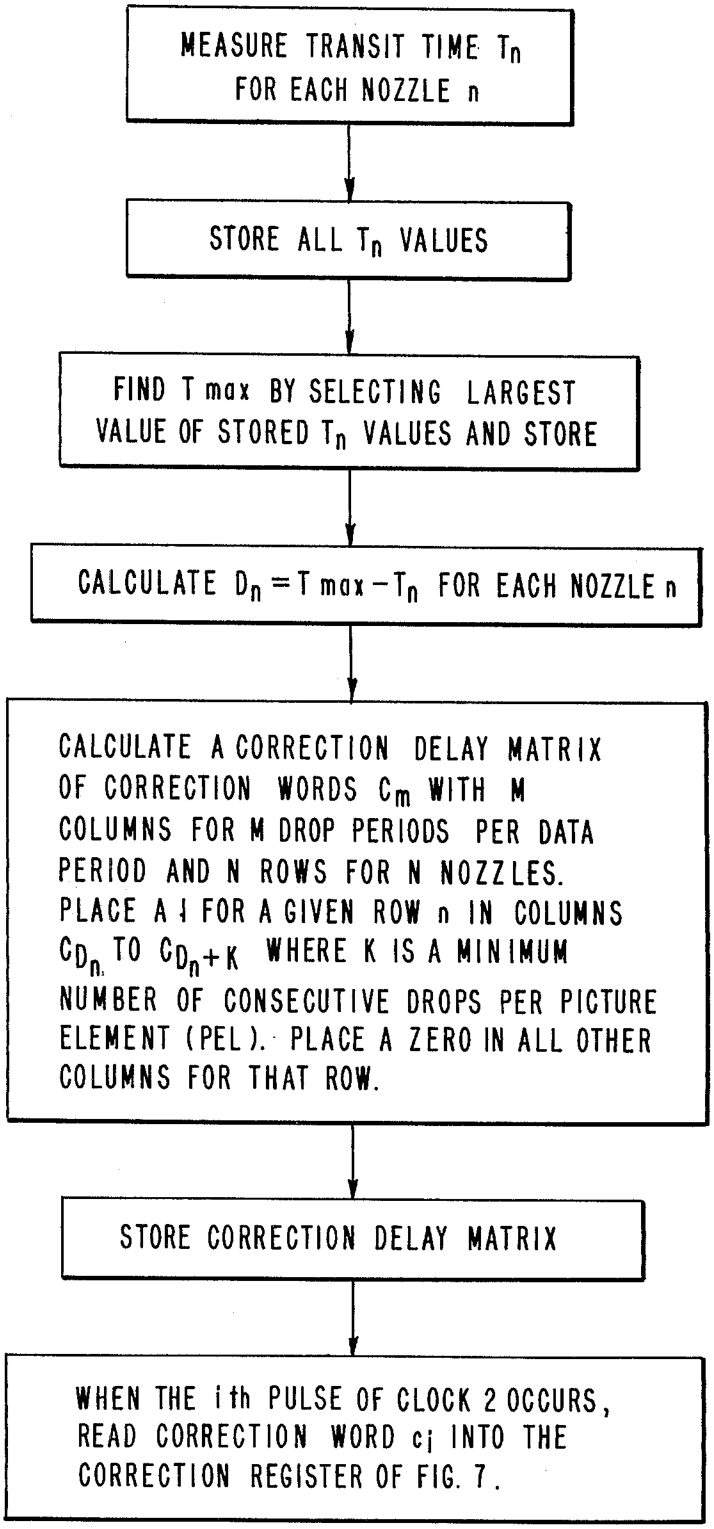
FIG. 5 is a flow chart which shows how to derive the transit time data of FIG. 3 and the matrix of FIG. 4 from the system.
Figure 6:
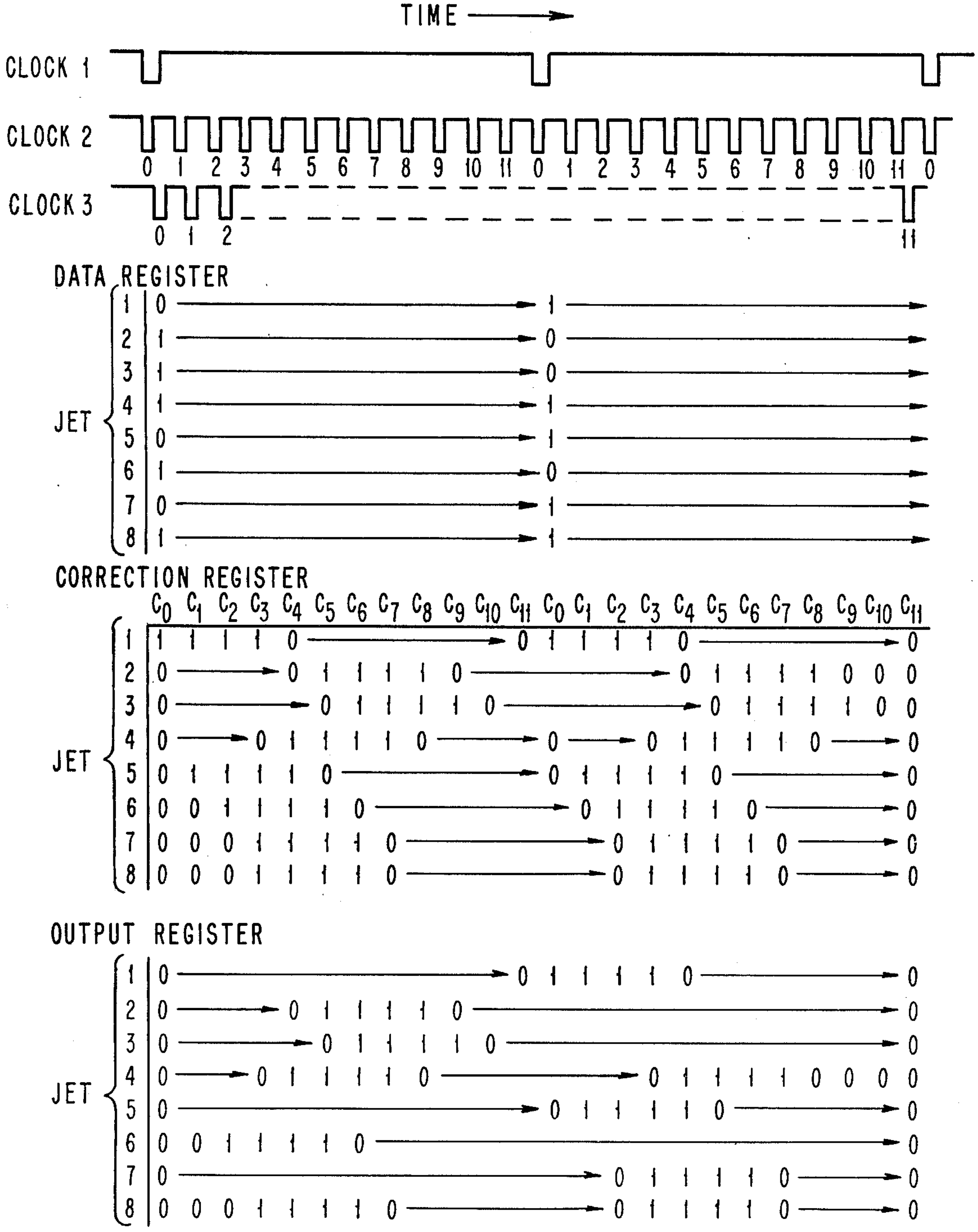
FIG. 6 shows the timing chart and the contents of the data register, correction register, and output register for two examples of data values and using the correction matrix of FIG. 4.
Figure 7:
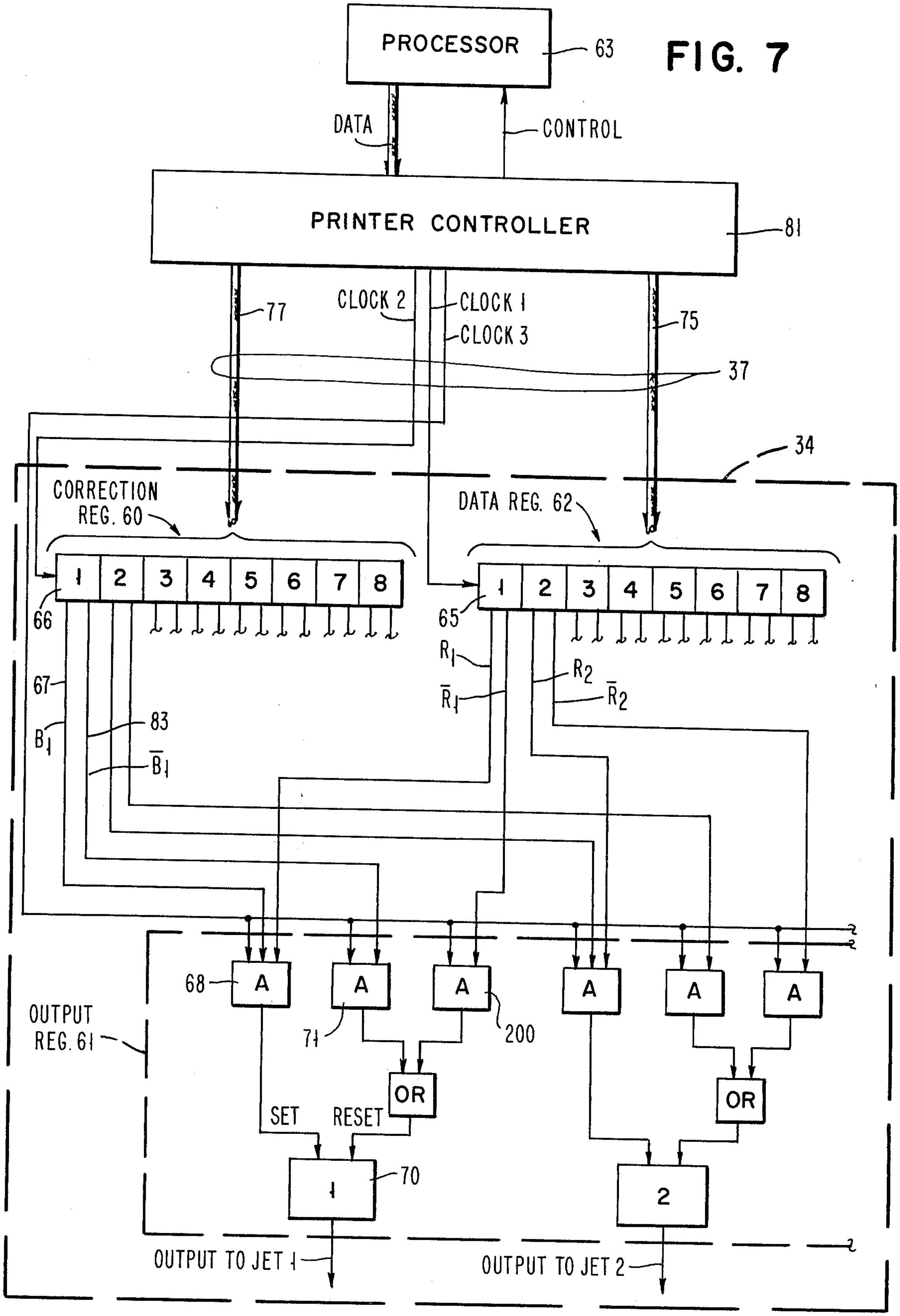
FIG. 7 shows the control system for the printer and the connections of the registers.

In FIG. 4 a matrix is shown which is derived by using the algorithm or procedure defined in FIG. 5 to calculate correction words $C_n$ for introduction into a correction delay register 60 shown in FIG. 7. Intuitively, one can see that since jet 1 is the slowest, having the maximum transit time, that its data printing signals should be first among those of the eight jets in FIG. 3. Now, in addition, it has been determined that in order for a data unit to print a large enough spot to be seen, K consecutive drop periods should be printed. For a particular desirable machine embodiment the number K should be 4. Thus, in FIG. 4, the correction bit $C_o$ for jet 1 is 1, since $C_o$ will be used to gate out the data imparting signal to the output register 61 in FIG. 7, which will turn on jet 1 at the very beginning of a data cycle, after the zero pulse of clock 3 in FIG. 6. In addition, the jet 1 bit in words $C_1$, $C_2$, and $C_3$ are all 1's too in order to continue to print any bit for K=4 drop periods, as explained above.

Now one can refer to FIG. 5 and follow through the steps defined there with respect to FIGS. 3 and 4 and see how they correlate.

FIG. 6 shows how the correction matrix of FIG. 4 is applied to a specific pair of values in a data register 62 in FIG. 7 with the correction register words $C_o$–$C_{11}$ going from the controller 81 to the correction register 60 for each data word.

The first word in the data register is binary 01110101. For the first bit position then, there will be no drop produced as reflected below in FIG. 6 for jet position 1 of the output register. The values in the correction register are not effective to produce an output, since data and correction register values at any given clock 3 time must both be 1's to produce a 1 in the corresponding output register.

The second jet data register value is a 1, but since bit 2 of $C_0$, $C_1$–$C_4$=0, the output register for jet 2 remains zero until drop time 5 when $C_5$=1 as do $C_6$, $C_7$ and $C_8$. Thus, the output register value for jet 2 is a 1 for times 5, 6, 7, and 8.

The example for the second data word starts off with a 1 for jet 1, so since jet 1 also has a 1 value for time 0, i.e., $C_0$=1, the first output data bit is a 1.

Referring to FIG. 7, in the jet 1 position 65 of data register 62, if at clock 1 time a "1" is applied to register position 65, then line $R_1$ is up. When line 67, $B_1$, is up because the value in the jet 1 latch 66 of correction register 60 is a "1," then AND 68 is turned on to activate flip-flop 70 to the "1" condition to deactivate the ink charging electrode 23 for jet 1, 51 so as to print a spot. K drop times later, line 67 will go down and line 83, $\overline{B}_1$ will go up. When clock pulse 3 occurs, AND 68 turns off and AND 71 turns on to reset latch 70. The purpose of AND 200 is to reset latch 70 when the data bit changes from a "1" to a "0". Operation of the remainder of the elements of the input register 62, correction register 60 and output register 61 operate in like manner as will be obvious to those skilled in the art of digital circuits as applied to ink jet technology.

Included on chip 34 are registers 60, 61, and 62. A clock generator in controller 81 provides clock 1, 2, and 3 signals which coordinate the operations of chip 34. Processor 63 sends input data words to controller 81 which in turn sends the data, the correction data and the clock signals to chip 34. The details of processor 63 and controller 81 are well known to those skilled in the art of data processing.

The operation of the delay logic may best be understood with the aid of FIG. 7. It is assumed that a controller 81 presents the printer with a coded data stream representing the material to be printed. Cable 77 is fed the N-bit correction word that was described in the previous section and contains the information as to when each charge electrode is to be presented with its data bit.

Note that two registers 60 and 62 are indicated as being N-bit long registers. These registers have been described as being fed data in parallel. They may be fed serially, in which case, the maximum length of these registers is determined by the requirement that they be filled in a time shorter than a drop cycle. Thus, each register may be divided into two or more segments, with the controller 81 responsible for arranging the data so that it is placed on the correct input lines. The clock signals would be changed appropriately to handle serial shifting. Due to pin limitations and modularity considerations more than to anything else, the number of nozzles that would be controlled by a single chip is probably of the order of 10–100, in which case it is unlikely that the registers would have to be divided into more than at most a few sections.

In printer operation, a new N-bit data word is provided once every M drop cycles. The function of the correction register 60 and the AND gates is to delay a bit which is destined for a charge electrode 23 until such time as the stream's transit time dictates. In a print head, applying a signal to the charge electrode 23 is equivalent to setting the appropriate flip-flop in the output register 61. In the print head, a flip-flop can be coupled to another higher voltage driver.

The logic functions as follows. At the start of a data cycle, assume the output register 61 is still set with data from the previous cycle. The data register 62 is then loaded with the new data information and, at the same time, the correction register 60 is loaded with the first N-bit correction word. Then there is a "1" in every location of register 60 for which the corresponding nozzles require zero delay. The data bits go to the output register 61 by ANDing each bit of each data bit in register 62 with its associated bit in register 60. If there is a "1" in both position i of register 62 and position i of register 60, then position i of register 61 is set to "print." If there is a "0" in position i of register 60 or position i of register 62, then position i of register 61 will be set "not to print".

One drop cycle later, the next N-bit delay word is loaded into the delay register, and the process is repeated. It is repeated until all the allowed delays have been cycled, at which time a new data word is at hand.

A preliminary sizing of the amount of logic required for the operations described above (i.e., those functions represented on the schematic) is a maximum of 20 gates per nozzle. (It is possible that this could be reduced by a factor of as much as five by using a custom shift register element design.) Thus, without any custom design, it appears that a 20-nozzle delay chip would have of the order of 400 gates. Note that the problem is made simpler by the very regular and simple functions that the chip is to perform.

The number of gates, pins, etc. is not dependent on whether the correction is to three or four-bit precision. The influence of that factor is the speed with which it is necessary to load the shift registers. In fact, the same basic design could be used for either three or four-bit precision, with the only likely change required being dividing the shift registers.

Break-off Uniformity

Velocity uniformity is usually a severe limit on printer performance. The errors that might be introduced by non-uniform drop break-off length should be less. For example, a stream which breaks off one full wavelength out of phase with the other streams will, in effect, have a data signal which is displaced by only one drop cycle. As shown above, this is the order of the residual error for which this scheme cannot correct. Break-off uniform to within a wavelength is achievable now for rather long arrays. On the other hand, a stream which breaks off ten wavelengths out of phase with the other streams will almost certainly break off outside the charging tunnel and, hence, will correspond to a "fail" state of that nozzle. Between those two extremes, however, this correction logic works to correct break-off nonuniformities as well as velocity nonuniformities. In fact, it cannot discriminate between the two sources of placement error.

Although one limit on using long nozzle arrays is, indeed, obtaining uniform holes, another problem is that of providing uniform excitation to long arrays. The scheme described here, or one that is equivalent, is required in order to print with high quality using long arrays, if other factors limit the uniformity of acoustic excitation giving rise to non-uniform drop break-off length.

| Numerical Example | | |
|---|---|---|
| data rate f data | = 9.6 KHz ($\tau$data = 104.17μs) | |
| | | $M = \frac{f\,drop}{f\,data} = 12$ |
| drop rate f drop | = 115.2 KHz ($\tau$drop = 8.68μs) | |
| jet diam. d jet | = 25.4μm | |
| drop separation Λ | = 139.7μm | |
| jet velocity $v_j$ | $= 139.7 \times 10^{-6}$ m $\times$ $115.2 \times 10^{3}$ sec$^{-1}$ | |
| | = 16.09 m/sec | |
| nozzle to paper dist. | = 1.25 cm | |

Suppose the correct volume of ink per resolvable or addressable spot requires K=4 drops at a resolution of $\nu$=8 pel/mm ($R=\nu^{-1}$=0.125 mm). The head is moved at a velocity $v_h$=R×fdata=1.2 m/sec. Resolution (R) is defined as the closest center-to-center spacing of independent pels.

The invention is most useful for long nozzle arrays, for instance N~50–1000. However, it can be used for short arrays as in this example where N=8, arbitrarily.

The drop misregistration on the paper is given by $\Delta X_p = v_h \times (T_{max} - T_{min})$ where Tmax and Tmin are the maximum and minimum transit times among the jets from the point of drop formation to the paper. These variations in transit time result from both velocity and break-off length variations. This can be expressed more conveniently as $$\Delta X_p \simeq R(T_{max} - T_{min})/M = R\ D_{max}/M$$

where R is one resolution element and the T's are the number of drops formed during transit time. For this example, Tmax=103 and Tmin=97, giving Dmax=6. Thus, without compensation, the print error is ½ of a picture element. With compensation, the error is reduced by a factor 6 to R/M, giving an error less than 1/12 of a picture element.

It is common to express the delay or transit time variation in terms of the velocity variation. In this case (Vmax−Vmin)/Vavg≃8.4%, assuming all error is from velocity and break-off variation is negligible. Using the invention, performance is comparable to what would be achieved with no correction and $\Delta V/V \simeq 1.4\%$.

Restated in another form, since the head parameters are chosen such that the head moves a distance corresponding to one picture element (R) during M drop cycles, the misregistration between the slowest and the fastest jet must be $\Delta X_p \simeq R/M \times D_{max}$ without compensation. With compensation, it is reduced to R/M.

What is claimed is:

1. In a system employing a plurality of movable elements, means for measuring at selected times the transit time of each of said elements on an intermittent basis and providing measured transit time values therefor, ordering means responsive to said measured transit time values for determining the relative order of said transit times of said elements and supplying a set of order signals representing said order, and means for energizing said elements at times varying from element-to-element in an order selected under control of said order signals.

2. In a system for printing by means of a plurality of liquid streams each one of which is selectively applied to mark a recording medium, the improvement comprising:

means for measuring at selected times the transit times of each of said streams on an intermittent basis and for providing sets of measured transit time values therefor, ordering means responsive to said measured transit time values for determining the relative order of said transit times of said streams and supplying a set of order signals representing said order, and means for energizing marking by said streams at times varying from stream-to-stream in an order selected under control of said order signals, whereby the effective transit times of said streams are compensated for during operation of said system for printing.

3. A multi-jet stream ink jet printer system including drop timing error correction comprising:

nozzle means for forming and propelling a plurality of streams of ink jet drops, controlling means for controlling drops from each of said nozzle means, sensor means positioned downstream from said nozzle means in the path of travel of said ink drops, means for measuring the transit time $T_n$ for a drop from each of said nozzles to said sensor means, means for determining the longest transit time $T_{max}$ for all of said nozzles, means for calculating the difference $D_n$ in delay from said maximum delay for each of said nozzles $D_n = T_{max} - T_n$, means for calculating based on difference $D_n$ a correction matrix for M drop periods per data period and N ink jet streams, means for strong said correction matrix, a data register, a correction register, and output register, means for reading said correction matrix out of said means for storing, one word at a time, M words into said correction register, means for enabling said correction register to control the gating of data bits into said output register from said data register in order to delay each stream by a prescribed number of units of time from the beginning of a data period during which a given data bit must be printed.

4. A printer system in accordance with claim 3 wherein said controlling means comprises a plurality of deflecting means.

5. A printer system in accordance with claim 3 wherein said controlling means comprises a plurality of charging means with one for each nozzle and deflection means.

6. A system in accordance with claim 3 wherein said sensor means is electrical.

7. A system in accordance with claim 3 wherein said sensor means is located adjacent to the edge of the location in said printer for a document to be printed.

8. A system in accordance with claim 7 wherein said sensor means is employed intermittently to measure said transit times.

9. A system in accordance with claim 5 wherein said registers are located on at least one integrated circuit chip bonded to a support, said support being integral with said charging means.

10. A system in accordance with claim 3 wherein said correction register is supplied a new correction word from said correction matrix for each drop formation period under control of said drop formation clock, and said data register is supplied a new data work for each data work period T.

11. A system in accordance with claim 3 wherein a picture element is comprised of a series of drop K successive drops long where K>1.

* * * * *